3,473,883
PROCESS FOR DYEING AND PRINTING
POLYESTER MATERIALS
Konrad Mix and Christian Heid, Frankfurt am Main,
Germany, assignors to Cassella Farbwerke Mainkur
Aktiengesellschaft, Frankfurt am Main-Fechenheim,
Germany, a company of Germany
No Drawing. Filed Sept. 20, 1965, Ser. No. 488,727
Claims priority, application Germany, Oct. 2, 1964,
C 34,009
Int. Cl. D06p 3/36, 3/48
U.S. Cl. 8—179                    3 Claims

ABSTRACT OF THE DISCLOSURE

Process for dyeing and printing of fibrous polyester materials utilizing a dinitro-phenyl-hydrazone disperse dyestuff.

---

The present invention relates to a process for the dyeing and printing of polyester materials.

British Patent 940,256 relates to a process for dyeing and printing materials containing ester groups with disperse dyes. This process is characterized by using as disperse dyes mono- or dinitro-aryl-hydrazones or -osazones or the phthalazones thereof which are insoluble or difficultly soluble in water; the phthalazones are obtained from mono- or dinitro-aryl-hydrazones of aromatic carbonyl compounds having a carboxylic group in ortho position to the carbonyl group by condensing said hydrazones to eliminate water.

The mono- or dinitro-aryl-hydrazones or -osazones mentioned in said British patent are derived from aliphatic, cycloaliphatic, aromatic, araliphatic or heterocyclic aldehydes or ketones.

We now have found that it is particularly advantageous to use as disperse dye a dinitro-phenylhydrazone of the formula

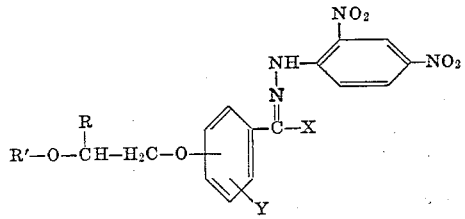

wherein:
X is selected from the group consisting of hydrogen, methyl, and hydoxyl,
Y is selected from the group consisting of hydrogen, methyl, and hydroxyl,
R is selected from the group consisting of hydrogen, methyl, and hydroxymethyl, and
R' is selected from the group consisting hydrogen, methyl, ethyl, hydroxyethyl, and methoxyethyl.

The process under the present invention yields chiefly yellow and orange dyeings and prints that distinguish themselves by very good fastness properties and are superior to comparable dyestuffs of said Briitsh patent with regard to their tinctorial power and fastness to thermofixation. Moreover, as compared with the dyestuffs mentioned in the cited British patent, the dyes used according to the present invention are not liable to bleeding out of the dyeings and prints prepared therewith.

The dyestuffs which may be used for the process of the present invention can be prepared in known manner by reacting 2,4-dinitrophenylhydrazine with the corresponding carbonyl compounds preferably in the acid pH-range.

The following table sets out a series of suitable disperse dyes and the shades obtained therewith:

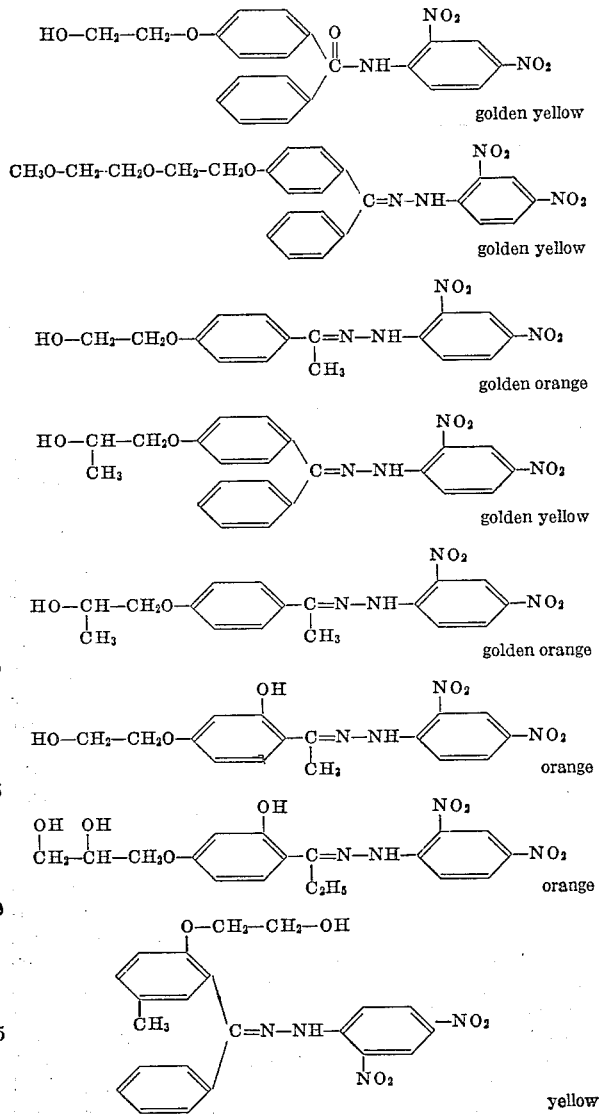

The transformation of the dyestuffs into the state of fine dispersion necessary for their use, i.e. into an average particle size of about 1μ, may be made for example by dissolving them in known manner in a water-miscible solvent or concentrated sulphuric acid, introducing the solution into water, filtering off the precipitated product with suction, washing and grinding and/or kneading it to the desired particle size, whilst adding conventional dispersion and grinding auxiliaries.

Dyeing is effected according to known methods, e.g. polyester materials are dyed in the presence of carriers at 80–125° C. or in the absence of carriers at 100°–140° C. possibly with the addition of dispersing agents. Printing and padding is carried out in the presence of a suitable thickening agent and the prints are fixed at elevated temperatures, with or without steam. The printing of polyester fibres may also be performed according to the known heat-fiixation process in the presence or absence of wetting agents.

The following examples will further illustrate how our invention may be carried out in practice, but the invention is not restricted to these examples. All degrees are degrees centigrade and the parts given are parts by weight.

EXAMPLE 1

A preliminarily cleaned polyester fabric based on polyethylene glycol terephthalate is padded on the foulard with the following dye liquor (pick-up of liquor 60%):

75 g. of an aqueous dyeing composition the preparation of which is described below,
4 g. of a commercial dispersing agent based on an ethoxylated product of a higher aliphatic alcohol,
50 g. alginate thickening (4%)
water 1 liter Subsequently, the fabric is dried at 100° and heated at 210° for 50 seconds. This is followed by a reductive after-treatment for 20 minutes at 50–60° with an aqueous liquor containing 6 cc./l. sodium hydroxide solution (38° Bé.) and 3 g./l. sodium dithionite. Then the material is rinsed and dried.

An intensively golden yellow dyeing with a very good fastness to thermo-fixation is obtained.

The dyeing composition used is prepared by grinding in a ball mill, to an average particle size of about 1μ, 1 part β-hydroxy-ethoxy-benzophenone-dinitro-phenyl-hydrazone and 1 part of the sodium salt of the dinaphthyl-methane disulphonic acid with 8 parts distilled water.

EXAMPLE 2

Preliminarily cleaned yarn based on polyethylene glycol terephthalate is pretreated at 80° for 10 minutes in a liquor containing 4 g./l. terephthalic acid dimethyl ester as carrier. Thereafter, 50 g./l. of a dyeing composition prepared from resacetophenone-mono-(hydroxy-propyl ether)-dinitro-phenyl-hydrazone as stated above and 1.5 g./l. of a dispersing agent based on an ethoxylated product of a higher aliphatic alcohol are added to the liquor and dyed at 125° for one hour (liquor ratio 1:20).

After rinsing and a reductive after-treatment, as stated in Example 1, and repeated rinsing an intensively orange dyeing with good fastness properties is obtained.

EXAMPLE 3

16 parts of a dyeing composition prepared from p-β-hydroxy-propoxy-acetophenone-dinitro-phenyl-hydrazone, as described in Example 1, are introduced into a dyebath consisting of 1000 parts water and 2 parts Marseilles soap. Subsequently, 30 parts of an acetate rayon fabric are introduced into the bath. The dyeing is carried out in a dyebath the temperature of which is brought to 80° in the course of 30 minutes and then maintained at this temperature for one hour. The material is rinsed with soft water and dried. A yellow dyeing of good fastness properties is obtained.

EXAMPLE 4

A fabric based on polyethylene glycol terephthalate is printed with the following printing paste:

190 g. of a dyeing composition prepared by grinding
  30 g. p-(β-hydroxypropoxy)-benzophenone-dinitro-phenyl-hydrazone,
  30 g. natrium salt of the dinaphthyl-methane-disulphonic acid and
  130 g. distilled water,
600 g. of a stock thickening consisting of
  480 g. crystal gum thickening (1:3),
  96 g. water,
  18 g. printing oil based on a mineral oil
  6 g. foam remover (an ester-based commercial composition) and
  210 g. soft water.

After drying, the printed fabric is treated for 50 seconds at 210°, subsequently cold rinsed, after-treated by reduction, as described in Example 1, rinsed again, and dried. A golden yellow print is obtained that distinguishes itself by an especially high fastness to dry-heat setting.

EXAMPLE 5

A triacetate fabric is printed with the following printing paste:

300 g. of a dyeing composition prepared by grinding
  30 g. 2-β-(β'-methoxy-ethoxy)-ethoxy-5-methylacetophenone-dinitro-phenylhydrazone
  30 g. sodium salt of the dinaphthyl-methane-disulfonic acid
  220 g. distilled water
  20 g. sodium salt of the xylene-mono- and disulfonic acid and
700 g. of a stock thickening consisting of
  525 g. crystal gum thickening (1:2)
  147 g. water
  21 g. sodium salt of the m-nitrobenzene sulfonic acid
  7 g. foam remover (an ester-based commercial composition)

After drying, the printed fabric is steamed at 1.5 atmospheres excess pressure for 10 minutes, subsequently rinsed and soaped with a non-ionogenic detergent, rinsed, and dried.

An orange coloured print of a high fastness to light and dry-heat setting is obtained.

It will be understood that this invention is susceptible to further modification and accordingly, it is desired to comprehend such modifications within this invention as may fall within the scope of the appended claims.

We claim:
1. A process for dyeing and printing a polyester material of fibrous structure with disperse dyes which comprises using as disperse dyestuff a dinitro-phenyl-hydrazone of the formula

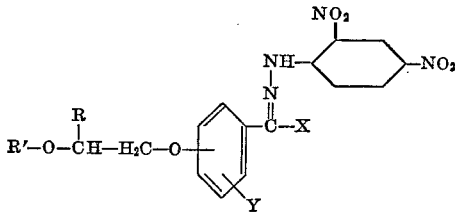

wherein:
X is selected from the group consisting of hydrogen, methyl, ethyl, and phenyl,
Y is selected from the group consisting of hydrogen, methyl, and hydroxyl,
R is selected from the group consisting of hydrogen, methyl, and hydroxymethyl, and
R' is selected from the group consisting of hydrogen, methyl, ethyl, hydroxyethyl, and methoxyethyl.

2. The process of claim 1 wherein the polyester material of fibrous structure is based on polyethylene glycol terephthalate.

3. The process of claim 1 wherein R, R' and Y are hydrogen and X is phenyl.

References Cited

FOREIGN PATENTS 940,256   10/1963   Great Britain.
1,019,120  3/1964   Great Britain.

NORMAN G. TORCHIN, Primary Examiner
S. E. CALLAGHAN, Assistant Examiner

U.S. Cl. X.R.
260—566

UNITED STATES PATENT OFFICE
CERTIFICATE OF CORRECTION

Patent No. 3,473,883        Dated October 21, 1969

Inventor(s) Konrad Mix et al

It is certified that error appears in the above-identified patent and that said Letters Patent are hereby corrected as shown below:

Column 1, line 51, "and hydroxyl" should read -- ethyl and phenyl --.

Column 2, line 5, that portion of the formula reading

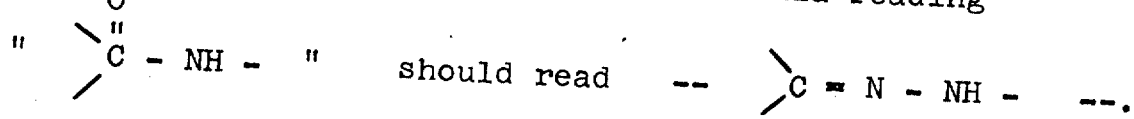

Column 4, line 40, that portion of the formula reading

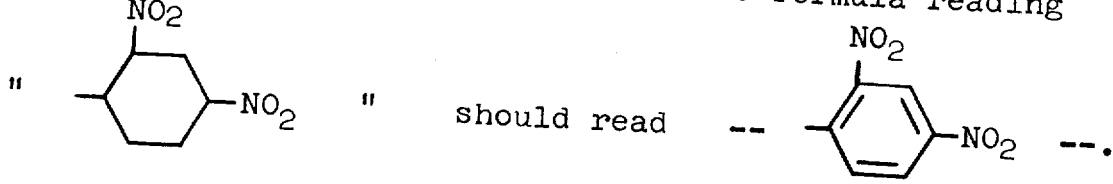

SIGNED AND SEALED
MAY 26 1970

(SEAL)
Attest:

Edward M. Fletcher, Jr.
Attesting Officer

WILLIAM E. SCHUYLER, JR.
Commissioner of Patents